(12) United States Patent
Fischer et al.

(10) Patent No.: US 8,439,572 B2
(45) Date of Patent: May 14, 2013

(54) WHEEL BEARING ASSEMBLY

(75) Inventors: Raphael Fischer, Herzogenaurach (DE);
Peter Niebling, Bad Kissingen (DE);
Roland Langer, Schwanfeld (DE);
Pavel Tseluyko, Schweinfurt (DE);
Peter Partheymueller, Marktgraitz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 847 days.

(21) Appl. No.: 12/594,362

(22) PCT Filed: Apr. 4, 2008

(86) PCT No.: PCT/DE2008/000577
§ 371 (c)(1),
(2), (4) Date: Nov. 18, 2009

(87) PCT Pub. No.: WO2008/122277
PCT Pub. Date: Oct. 16, 2008

(65) Prior Publication Data
US 2010/0119185 A1    May 13, 2010

(30) Foreign Application Priority Data

Apr. 5, 2007 (DE) .......................... 10 2007 016 427

(51) Int. Cl.
*F16C 35/063* (2006.01)
*F16C 33/60* (2006.01)

(52) U.S. Cl.
USPC .......................................... 384/544; 384/589

(58) Field of Classification Search ................ 384/544, 384/589; 29/898.061, 898.062; 403/359.1–359.6; 464/178
See application file for complete search history.

(56) References Cited

U.S. PATENT DOCUMENTS

| 3,009,742 A | * | 11/1961 | Rabe et al. ............... 301/35.627 |
| 4,047,770 A | * | 9/1977 | Korenhof et al. ............. 384/482 |
| 4,460,058 A | * | 7/1984 | Welschof et al. ............. 180/258 |
| 4,493,388 A | * | 1/1985 | Welschof et al. ............. 180/258 |
| 4,893,960 A | * | 1/1990 | Beier et al. ....................... 403/24 |
| 5,806,936 A | * | 9/1998 | Guimbretiere ............. 301/105.1 |
| 6,146,022 A | | 11/2000 | Sahashi et al. |

FOREIGN PATENT DOCUMENTS

| DE | 25 43 210 A | 4/1976 |
| DE | 31 16 720 A | 10/1982 |
| DE | 36 36 243 | 5/1988 |
| DE | 103 38 172 A | 6/2005 |
| DE | 10 2005 018 126 | 10/2006 |
| WO | 2007/054190 | 5/2007 |

\* cited by examiner

*Primary Examiner* — Phillip A Johnson
(74) *Attorney, Agent, or Firm* — Lucas & Mercanti, LLP

(57) ABSTRACT

The wheel bearing assembly connects a journal section of the hub and a joint body. The wheel bearing assembly has an adapter section is connected to a joint cap, a journal section connected to a wheel hub. A separate inner ring is located on the journal section. The adapter section and the journal section intermesh by means of end gearing. The assembly also has a tensioning element that mutually braces the adapter section and the journal section under an overall pre-tension, the end gearing being braced by a first pre-tension along a first force path A between the adapter section and the journal section and the inner ring being braced by a second pre-tension along a second force path B between the adapter section and the journal section. At least some sections of the first and second force paths A and B are parallel.

34 Claims, 18 Drawing Sheets

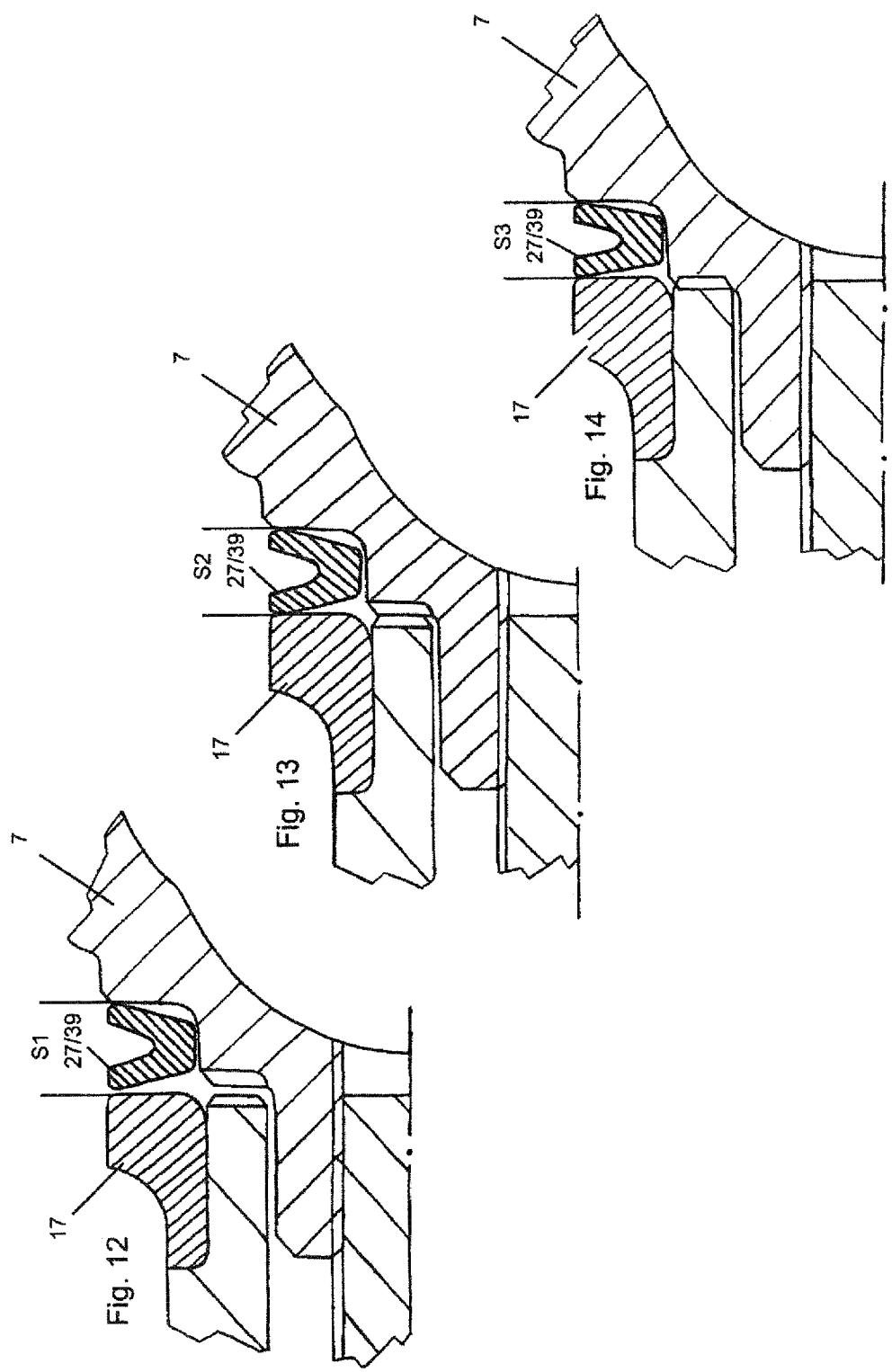

WHEEL BEARING ASSEMBLY

This application is a 371 of PCT/DE2008/000577 filed Apr. 4, 2008, which in turn claims the priority of DE 10 2007 016 427.2 filed Apr. 5, 2007, the priority of both applications is hereby claimed and both applications are incorporated by reference herein.

The invention relates to a wheel bearing assembly comprising an adapter section, which is and/or can be connected to a joint cap or another adapter element, a journal section which is and/or can be connected to a wheel hub, an inner ring, which provides a raceway for rolling elements of the wheel bearing assembly and which is arranged on the journal section, the adapter section and the journal section intermeshing with one another via a spur gear toothing, and comprising a tensioning element, which reciprocally braces the adapter section and the journal section under an overall pre-tension, the spur gear toothing being held by a first pre-tension along a first force path between the adapter section and the journal section.

Driving torque is often transmitted to a driven wheel of a motor vehicle via a constant-velocity joint, which has an outer joint body—usually embodied as a joint cap—to the hub of the driven wheel. In a construction of known type the hub comprises a journal, which is rotationally locked to the outer joint body for transmitting the driving torque. There are a number of known solutions for achieving the connection between the outer joint body and the journal:

The document DE 42 10 461 A1, for example, proposes to form a journal having a toothing, which runs radially around an outer cylindrical surface and which meshes with a corresponding formed mating tooth system in the interior of a hollow cylindrical journal of the hub, integrally onto the outer joint body.

A conceptually different type of connection is taught by DE 31 167 20, the journal of the hub and the outer constant-velocity joint intermeshing with one another via a common spur gear toothing. The journal at the same time carries raceways for the rolling elements of the wheel bearing, the raceways being integrally formed on the journal.

DE 36 046 30 A1 shows a similar embodiment, likewise having spur gear toothing and raceways integrally formed on the journal.

DE 36 36 243 C2, by contrast, discloses an assembly comprising an outer joint body and a journal of a hub, which are rotationally locked to one another via a spur gear toothing, only one raceway of the rolling bearing, however, being integrally formed into the journal and the other raceway instead being arranged on a separately attached inner ring. The inner ring is axially held and pre-tensioned by an end of the journal, deformed to provide a positive interlock. This clinched end, which takes the form of a rolled rivet collar, provides the surface for the spur gear toothing on the end face.

DE 10 2005 009 935 A1, which probably forms the closest pertinent state of the art, also shows such a connection, a spur gear toothing here too rotationally locking the journal and the outer joint body and one raceway being afforded on the journal itself while the other raceway is provided on a separate inner ring. The separate inner ring is arranged on the journal and is positively secured on the journal by a rolled rivet collar.

The object of the invention is to propose a wheel bearing assembly having a connection between a journal section of the hub and an adapter section of a joint body or the like, which is cost-effective to produce and/or which takes up only a very small installation space.

According to the invention, a wheel bearing assembly is proposed, which affords a torsionally secured connection between a hub of a wheel and a drivetrain of a vehicle.

The wheel bearing assembly comprises an adapter section, which with a joint cap of a constant-velocity joint, in particular a rotating joint, or with another adapter element, in particular an outer joint body, is or can be connected to a drivetrain. The adapter section is preferably integrally connected to the joint cap and/or the adapter section, although in less preferred exemplary embodiments, the adapter section may be attached in some other way.

The wheel bearing assembly further comprises a journal section, which is and/or can be connected to the wheel hub. Here too, the journal section is preferably integrally connected to the wheel hub, in order to minimize the number of connections. It is also possible here, however, for the journal section to be connected to the wheel hub or another intermediate element in some other way, for example by bolts or a cohesive material joint.

The wheel bearing assembly further comprises an inner ring—also referred to as the bearing inner race—which is formed separately from the journal section and which provides a raceway for rolling elements of the wheel bearing assembly. The rolling elements preferably take the form of balls and in modified embodiments—particularly for higher loads—they are preferably embodied as tapered rollers. The inner ring preferably only provides one raceway for the rolling elements; a second or further raceways may be arranged, for example, on the journal section or on a further inner ring. Alternatively the inner ring may also carry two or more raceways. The adapter section and the journal section intermesh with one another, particularly in a torsionally secured manner, via a spur gear toothing, which is preferably embodied as a Hirth toothing. The longitudinal profile of the teeth of the spur gear toothing is preferably oriented radially to the axis of rotation of the wheel bearing assembly. The adapter section comprises a first toothing, which preferably extends in a radial plane perpendicular to the axis of rotation of the wheel bearing assembly and intermeshes in a torsionally secured manner about the axis of rotation with a second toothing on the journal section. In modified embodiments the toothing systems may also be arranged on conically tapering surfaces or other surfaces.

A tensioning element is designed to reciprocally brace the adapter section and the journal section under an overall pre-tension. The tensioning element may be embodied, for example, as a tightening screw, which is passed through the hollow cylindrical journal section from the outside of the wheel hub and can be screwed into a socket of the adapter element or the joint cap, the overall pre-tension being generated by the contraction of the tightening screw and the adapter element. Alternatively it is also possible for the adapter element to have a threaded journal, onto which a nut is placed from the outside of the wheel hub and in this way to generate the overall pre-tension. The overall pre-tension generated serves to pre-tension the spur gear toothing in an axial direction by a first pre-tension along a first force path between the adapter section and the journal section.

It is now proposed in the context of the invention that the inner ring be held with a second pre-tension along a second force path between the adapter section and the journal section, the first and second force paths, at least in part, running parallel to and therefore separately from one another. In functional terms this represents a kinematic connection of the force paths in parallel.

The invention therefore allows the first pre-tension, which acts on the spur gear toothing, and the second pre-tension, which acts on the inner ring, to be separated from one another. The advantage of this configuration is that the new concept allows the first and second pre-tension to be adjusted differently to suit the load ('divide et impera'—'divide and rule').

The proposed wheel bearing assembly affords a double fit, since both for the first force path and for the second force path, the inner ring and first toothing on one side and the adapter element and second toothing on the other side, lie parallel, adjoining and/or adjacent to one another.

In order to adjust the preferably different pre-tensions, in the simplest embodiment, the workpieces are produced so that the required pre-tensions are automatically set on tightening of the tensioning element. This can be achieved, for example, in that, as the workpieces are brought together, first the first force path and then—after building up a certain pre-tension—the second force path is closed. In another possible method of implementation it is possible to insert intermediate rings, which have different widths in an axial direction and which are individually selected on the basis of a journal section—adapter section pairing, so that the required pre-tensions are set.

In a preferred design embodiment of the invention, the journal section in the end area is of cylindrical external shape and provides a seat for the inner ring. This configuration makes the inner ring easy to fit and, if necessary, to replace, for example in the event of damage. It is not necessary either to introduce the running surface assigned to the inner ring on the flange section itself, or to fix the inner ring to the running surface by means of a collar, in particular a rolled rivet collar. The end face of the end section here comprises the first spur gear toothing, the radial extent of the spur gear toothing being smaller than the inside diameter of the inner ring. On the adapter section side, an area with the second spur gear toothing is provided, together with another area, which directly or via an intermediate means pre-tensions the inner ring in an axial direction.

In a preferred embodiment of the invention the journal section is embodied as a straight, hollow cylindrical section, the interior space of the journal section preferably constituting a cylindrical shell-shaped or conically tapered surface. This embodiment is easy to produce and the cylindrical shell-shaped or conically tapered seat can be used to grip positively around an extension of the adapter section, providing an aid to assembly and/or stabilization to prevent tipping.

In a development of the invention one or more elastic and/or elasto-plastic deformation means are inserted in the first and/or in the second force path, where they afford an additional deformation travel, at least in one of the force paths. The deformation means is preferably designed so that—at least under low pre-tensioning forces and/or in an initial range of the pre-tensioning force—it is softer than the other components in the first and/or the second force path.

The advantage of this development is that the deformation means allows compensation for tolerances in respect of the double fit described. Use of the deformation means produces a pre-tensioning range for the force path in which the deformation means is arranged, so that the pre-tensioning force increases only slightly as the tensioning element is tightened.

The deformation means is preferably designed and/or arranged so that in the fitted state, the magnitude of the first pre-tension is greater than the magnitude of the second pre-tension of the wheel bearing assembly.

In a preferred development the components are dimensioned so that in the assembled state of the wheel bearing assembly the deformation means is subjected to a pre-tension such that the deformation means is plastically deformed. While with an elastic deformation the gradient of the stress-strain diagram is very steep, the gradient diminishes drastically in the plastic range. In the plastic range, therefore, use can be made of a comparatively greater deformation travel of the deformation means without substantially increasing the resultant pre-tension. The deformation means acts as a limit on the maximum pre-tensioning force in the respective force path.

It is further preferred, however, that the working range of the deformation means in the fitted state lies below an ultimate failure limit of the deformation means. It is therefore preferred that a fracture strain be excluded, something which can be achieved, for example, in that the intended deformation does not exceed 50% of the fracture strain. If the fracture strain is 8%, for example, the actual deformation should not exceed 4%.

In a first possible design development of the invention the deformation means is embodied as an element or element assembly, which is integrally formed onto the adapter section and which is connected in the second force path between the adapter section and the bearing race; the adapter section presses on the inner ring via the formed-on element. In one practical embodiment the deformation means takes the form, for example, of a circumferential rib, which, when assembled, preferably bears with the free end section against the inner ring. The rib or rib sections are oriented along a conically tapered surface, for example, so that the rib can in part yield elastically and is in part plastically deformed. In other embodiments the rib or the rib sections are virtually or completely oriented along an outer cylindrical surface, so that the elastic component of the deformation is very slight but the plastic component is very high.

In another possible embodiment of the invention, the deformation means is embodied as a deformation zone in the journal section. For example, the journal section may have areas of reduced material thickness, for example in the form of recesses, which are formed, for example, on the inner face and/or outer face of the journal section, preferably helically. The deformation zone can optionally be formed so that the deformation, when subjected to a pre-tension in the direction of the transmission side, is greater than in the direction of the wheel.

In another possible embodiment of the invention, the deformation means is embodied as a deformation zone in the inner ring. The inner ring therefore here assumes a dual function, partly as carrier of the raceway for the rolling elements and partly—in a limited range—as deformation means. In a first possible embodiment, the deformation zone is embodied as one or more circumferential grooves, which are preferably arranged on the axial side of the inner ring facing the adapter section. Other material weakenings can also be introduced instead of the circumferential grooves. In particular, the advantage of this embodiment is that the position of the raceway of the inner ring does not change as the deformation travel is used up. The inner ring may optionally be either fully or partially hardened. In the first case the inner ring behaves more elastically, in the second case rather elasto-plastically. The groove zone or more generally the deformation zone may be located both on the radially outer side and on the radially inner side of the inner ring.

In a less preferred embodiment of the invention, the deformation zone is introduced on the side of the wheel on or in the inner ring, which has the inherent disadvantage, however, that the position of the raceway is displaced in an axial direction as the displacement travel is used up. In this embodiment, the deformation zone, as in the case of the journal section, may be formed symmetrically or asymmetrically on the inside and/or outside as recesses, corrugations or helical shapes. The inner ring can likewise be partially or fully hardened.

In a particularly preferred embodiment of the invention, the deformation means is embodied as a separate intermediate ring. In this solution the other components of the wheel bearing assembly can be produced without deformation zones, thereby simplifying their load stress-bearing design.

The intermediate ring may be arranged either between the inner ring and the journal section or between the inner ring and the adapter section. The second positioning is preferable, however, since in the event of a deformation of the intermediate ring the position of the inner ring inside the rolling bearing does not change.

The intermediate ring may be embodied as a spring ring or as a compression ring or a combination thereof, so that a predominantly elastic or a predominantly plastic deformation occurs in the working area, according to the particular application.

In one possible embodiment, the intermediate ring has a spring geometry that allows the spring ring to react elastically at least along a part of the deformation travel. In one conceivable realization, the intermediate ring, in longitudinal section through the axis of rotation of the wheel bearing assembly, is folded at least once. This geometry allows elastic compression of the intermediate ring. For example, the intermediate ring is of V-shaped design in longitudinal section. In other embodiments the intermediate ring is of arched design, so that the elastic deformation is translated into an increase in the arch.

In a first possible implementation of the invention, the deformation means is arranged in the first force path, the wheel bearing assembly being designed so that during assembly a pre-tension is first formed on the first force path and a pre-tension is formed on the second force path only once a proportion of the first pre-tension has been built up. In an alternative embodiment, the deformation means is arranged in the second force path, the bearing assembly being designed so that during assembly a pre-tension is first formed on the second force path and a pre-tension is formed on the first force path only once a proportion of the second pre-tension has been built up.

Although in the preceding description only a single deformation means has ever been specified, it is also possible for these deformation means to be used in any combination. Thus it is possible to insert a deformation means in each force path or to use two identical or different deformation means in one force path.

The present invention also relates to a bearing assembly, the object of which is also to create a compact unit comprising wheel hub, bearing assembly and constant-velocity joint, in particular a rotating joint, which is easy to assemble and dismantle. This aspect of the invention is based on the realization, that the stated object can be achieved in a surprisingly simple manner in that the journal of the outer joint body is of conically tapered design, in such a way, that the diameter of the journal oriented towards the wheel hub is smaller than the diameter of the journal in the transitional area to a spur gear toothing introduced into the outer joint body, which corresponds to a spur gear toothing introduced into the stub shaft of the wheel hub. Here the spur gear toothing or the pair of spur gear toothing systems is arranged axially and radially at least partly below the rolling bearing. Therefore, the invention proceeds from a bearing assembly of a motor vehicle wheel hub, which can be driven via a constant velocity joint and in which the wheel hub connected to a wheel flange and the constant velocity joint connected to a drive shaft are rotationally locked together by means of a toothing and are axially connected together by a threaded bolt engaging in a central journal of the constant velocity joint.

A double or multi-row rolling bearing having an inner ring with at least one separate bearing inner race is fitted on the wheel hub.

An end face of an stub shaft of the wheel hub has a spur gear toothing, which can be rotationally locked to a corresponding spur gear toothing of the joint body of the constant velocity joint. Moreover, the separate bearing inner race projects with an end face axially beyond the end of the stub shaft of the wheel hub. It is additionally provided for the spur gear toothing systems to be arranged radially and axially at least partly below the rolling bearing.

The journal of the outer joint body is of conically tapered design, a diameter D2 of the journal in the area of its wheel side, front end area being smaller than its joint-side diameter D1, so that for these diameters D1>D2.

This construction advantageously serves to increase the thread-bearing portion of the bolt. In addition, the conically tapered journal of the outer joint body facilitates assembly with the wheel hub. The journal can now easily be introduced into the wheel hub and due to the larger diameter has a self-centering action when introduced into the wheel hub. This also helps to save weight.

A bearing assembly is therefore created in a surprisingly simple manner from individual components, some of which are known in the art, said bearing assembly not only being of narrow and/or short construction but also allowing easy and precise assembly of the wheel hub and constant velocity joint in an entirely new way.

The system is likewise tensioned by way of a bolt in the form of an expansion bolt. The omission of the driveshaft journal that would otherwise be necessary also saves weight. The fact that the spur gear toothing is situated at least partly radially inside the rolling bearing means that the bearing assembly according to the invention is of particularly short overall length.

Furthermore, it may be provided that the outside diameter $D_{VER}$ of the spur gear toothing can be smaller than or equal to the bore diameter $D_{IR}$ of the inner ring, so that for these diameters: $D_{VER} \leqq D_{IR}$.

In other practical developments, it may be provided that the inside diameter $D_{IVER}$ of the spur gear toothing is smaller by at least a factor of 0.95 than the outside diameter $D_{VER}$ of the spur gear toothing, so that for these diameters: $D_{IVER} < 0.95 \times D_{VER}$.

In another development of the invention, the row interval $R_{AB}$ of the bearing balls is smaller than the outside diameter $D_{VER}$ of the spur gear toothing, so that for the ratio of $R_{AB}$ to $D_{VER}$ the following relationship applies: $R_{AB} < D_{VER}$.

Without departing from the scope of the invention, the pitch diameter $V_{TK}$ of the spur gear toothing is also smaller than the pitch diameter GTK of the joint balls of the constant velocity joint, so that for these diameters: $V_{TK} < GTK$.

In an especially practical development of the invention, the inner ring cross section height IQ, at the lowest point of the ball raceway, is at least 0.2 times the diameter ($D_W$) of the bearing balls, so that for the ratio of IQ to $D_W$ the following relationship applies: $IQ \geqq 0.2 \times D_W$.

Also particularly advantageous is a development of the invention, which is distinguished by the fact that the distance LZ of the wheel hub viewed from the center line of the transmission-side ball row to the addendum circle of the spur gear toothing is positive.

Without departing from the scope of the invention the outside diameter $D_{VER}$ of the spur gear toothing is also more than twice the diameter $D_W$ of the bearing balls, so that for these diameters: $D_{VER}$ 25>2×$D_W$.

An outstanding feature of other practical developments of the invention is that the bearing inner race is connected to a means for the axial compensation of tolerances between the bearing inner race and the opposing face of the joint body. This is particularly advantageous because it eliminates a possible tolerance problem occasioned by a double fit between the spur gear toothing and the contact of the separate bearing inner race with the joint cap.

This development may be further supplemented in that the means for the axial compensation of tolerances between the bearing inner race and the opposing face of the joint body is an axial recess in the form of an annular groove in the end face of the joint body.

Of equally practical use is a development of the invention in which the toothing angle β is arranged positively or negatively to the plane of rotation of the bearing assembly, in particular at an angle β of ±30°. This development can be further supplemented in that the toothing angle β is inclined in relation to the outer joint body.

The combination of the tooth skew of the spur gear toothing in relation to the pre-tensioning of the expansion bolt or the wheel hub affords protection against overload. For if the torque applied exceeds the design maximum, the teeth of the spur gear toothing, in opposition to the resistance of the expansion bolt against the load flanks, slip axially apart and the teeth engage in the next gap.

Finally, a development of the invention with the distinguishing feature that the spur gear toothing is a Hirth toothing, particularly one with from 12 to 60 teeth running radially, is particularly advantageous.

Further features, advantages and effects of the invention are set forth in the following description of preferred exemplary embodiments of the invention. In the drawings:

FIGS. 12-14 show an illustration of the assembly of the exemplary embodiment in FIG. 10;

Corresponding or identical parts are provided with the same reference numerals in each of the figures.

DETAILED DESCRIPTION OF THE DRAWING

Figure 1:
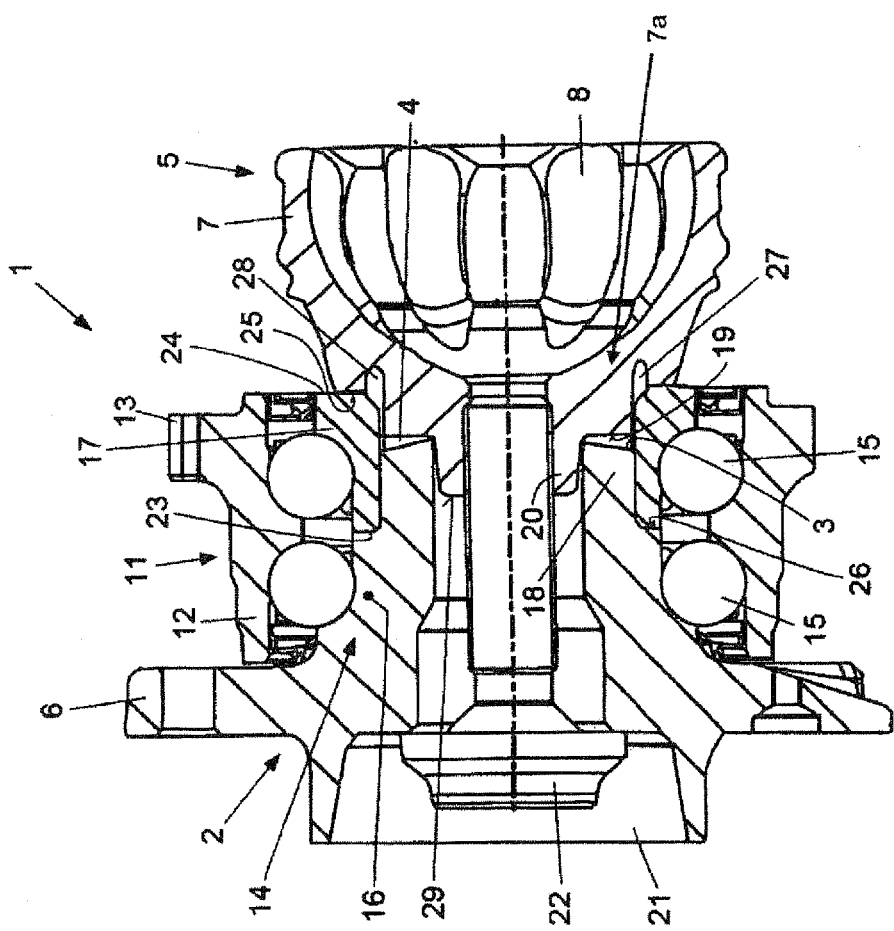
FIG. 1 shows a sectional view through an exemplary embodiment of a bearing assembly according to the invention.
Figure 2:
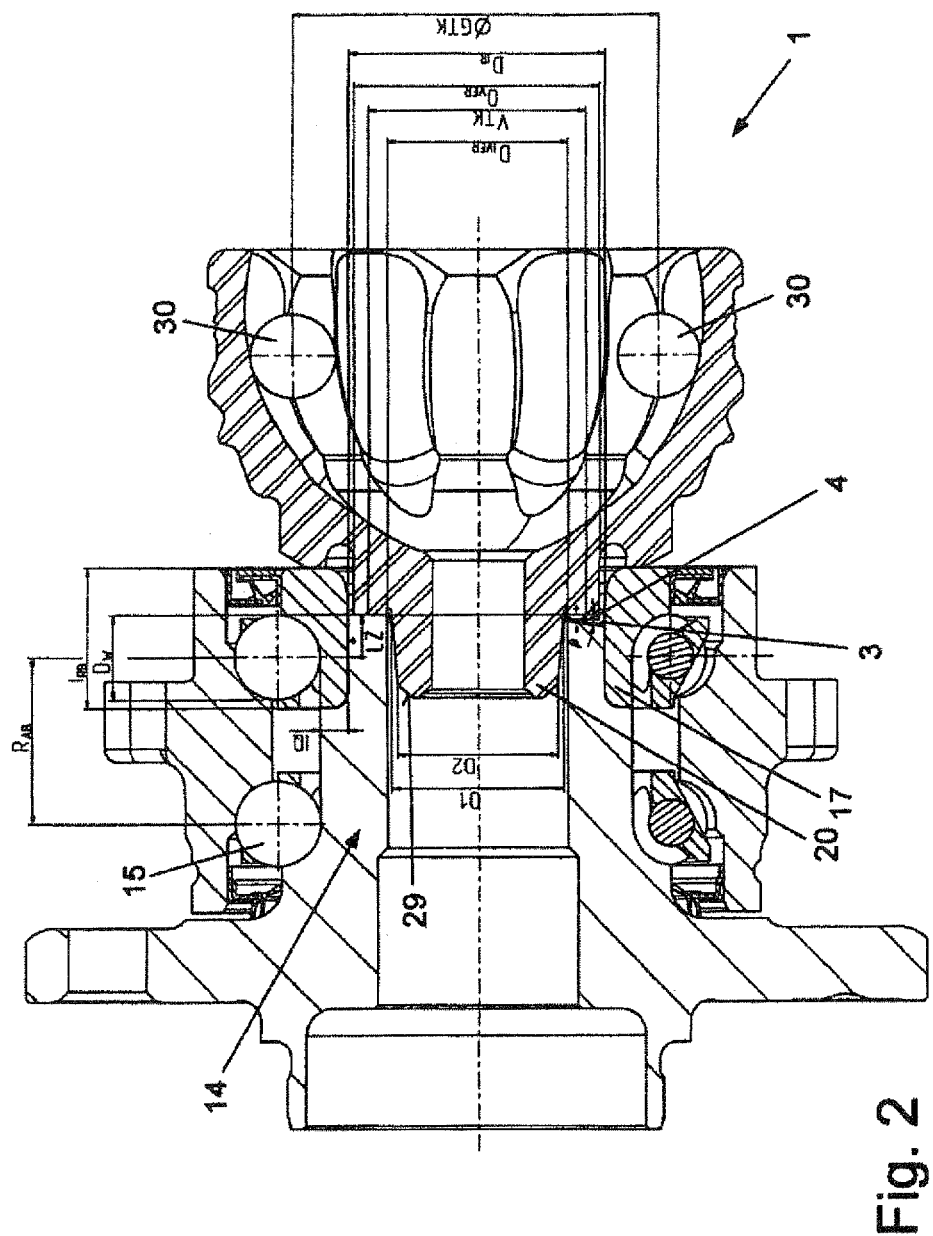
FIG. 2 shows another sectional view through an exemplary embodiment of a bearing assembly according to the invention.

FIGS. 1 and 2 each represent a bearing assembly 1 in longitudinal section, using the same reference numerals for identical parts.

FIG. 1 represents an exemplary embodiment of a bearing assembly 1 in longitudinal section. The bearing assembly 1 comprises a wheel hub 2 of a motor vehicle (not shown). The wheel hub 2 is connected via a spur gear toothing 3, 4 to a rotating joint or constant velocity joint 5 known in the art. At one axial end the wheel hub 2 comprises a wheel flange 6 for receiving a rim of a vehicle wheel (not shown).

The constant velocity joint 5 comprises an outer, bell-shaped joint body 7, which on its inner circumferential surface is provided with raceways 8, which serve to accommodate joint balls (not shown), the latter being guided in a known manner in windows of a cage (likewise not shown). The joint balls serve to transmit torque from an inner joint body (likewise not shown) to the outer joint body 7, the inner joint body being connected to a shaft section of a drive shaft.

A double-row rolling bearing 11 in the form of an angular-contact ball bearing is arranged in an O-arrangement on the wheel hub 2. The rolling bearing 11 comprises an outer ring 12, onto which a fixing flange 13 for a wheel carrier is formed, together with an inner ring 14. Bearing balls 15 serving as rolling elements are arranged between the outer ring 12 and the inner ring 14. The inner ring 14 comprises two bearing inner races 16 and 17, an inner bearing inner race 16 situated axially on the wheel side relative to the longitudinal extent of the wheel hub 2 being integrally formed onto the wheel hub 2, while an outer bearing inner race 17 situated axially on the transmission side is a separate component, which is pushed onto a stub shaft 18 of the wheel hub 2.

The spur gear toothing 4, which meshes with the corresponding spur gear toothing 3 of the stub shaft 18, is provided in the area of an adapter section 7a of the joint body on an axially outer end face 19 of the outer joint body 7. This spur gear toothing 3, 4 serves to transmit a torque from the constant velocity joint 5 to the wheel hub 2. The spur gear toothing 3, 4 is situated radially and axially below the rolling bearing 11, approximately centrally below the separate bearing inner race 17. A journal 20 which has a bore provided with an internal thread, is formed in the center of the end face 19 of the outer joint body 7. A bolt 22, accessible from a central bore 21 of the wheel hub 2 is screwed into this bore. This central bore 21 is accessible through a central bore (not shown) of the vehicle wheel rim, so that it is possible to detach or to fit the profiled shaft (not shown) with the constant velocity joint 5 from the outside of the vehicle.

The outer, separate bearing inner race 17 situated axially on the transmission side has an inner end face 23 situated axially on the wheel side and an outer end face 24 situated axially on the transmission side, the latter being oriented towards a radial opposing or end face 25 of the joint body 7 and bearing against the latter. When the bolt 22 is tightened the wheel hub 2 and the outer joint body 7 are moved axially towards one another until the spur gear toothing systems 3, 4 intermesh with one another. At the same time, the opposing face 25 of the joint body 7 presses against the outer end face 24 of the separate bearing inner race 17 situated axially on the transmission side and presses this bearing inner race 17 against a locating surface 26 of the inner bearing inner race 16 situated axially on the wheel side.

Since the spur gear toothing systems 3, 4 are situated radially relatively far below the rolling bearing 11 and/or lie kinematically parallel, the problem arises, when bracing the wheel hub 2 with the constant velocity joint 5, of the redundancy for the required absence of axial play of the toothing and wheel bearing clearance by way of two axial contact points in the area of the spur gear toothing 3, 4 and the contact of the opposing face 25 against the end edge 24 of the bearing inner race 17.

To eliminate this problem the bearing inner race 17 is connected to a means 27 in the area of the adapter section 7a for the axial compensation of tolerances between the bearing inner race 17 and the opposing face 25 of the joint body 7. In the embodiment according to FIG. 1 this means 27 for the axial compensation of tolerances is an axial recess in the form of an annular groove 28 in the opposing face 25 of the end face 19 of the joint body 7. The recess 28 ensures an elastic deformability in the area of the opposing face 25, so that during assembly a contact free from play is achieved between the stub shaft 18 and the joint body 7, first in the area of the end faces 24, and then in the area of the spur gear toothing 3, 4. The required tolerance compensation for reliable bracing of the separate bearing inner race 17 in the rolling bearing 11 is ensured by the elastic deformability in the area where the joint body rests against the separate bearing inner race 17.

In order to increase the thread-bearing portion of the bolt 22, the journal 20 is of conically tapered design, so that the diameter of a front end area 29 of the journal 20 is smaller than the diameter of the journal 20 in the area of the transition to the toothing 4.

FIG. 2 shows a slightly different view of the bearing assembly 1 in FIG. 1, showing joint balls 30 in the outer joint body 7 of the constant velocity joint 5 instead of the bolt 22. In order to illustrate the parameters, in the representation according to FIG. 2 the use of reference numerals has been largely abandoned in favor of an illustration of the diameters and widths through dimensioning lines and identification letters.

These identification letters are:

$D_{VER}$: outside diameter of the spur gear toothing 3, 4
$D_{IR}$: bore diameter of the separate inner ring 14
$D_{IVER}$: inside diameter of the spur gear toothing 3, 4
$R_{AB}$: row interval of the bearing balls 15
$I_{RB}$: width of the separate bearing inner race 17
$V_{TK}$: pitch diameter of the spur gear toothing 3, 4
GTK: pitch diameter of the joint balls 30
LZ: distance of the wheel hub 2, at the center line of the transmission-side ball row, from the addendum circle of the spur gear toothing 4
$D_W$: diameter of the bearing ball 15
IQ: cross section height at the lowest point of the ball raceway of the separate bearing inner race 17
D1: diameter of the journal 20 in the area of the transition to the inside diameter $D_{IVER}$ of the spur gear toothing 3, 4
D2: diameter of the journal 20 in the area of its front, wheel side end area 29
β: toothing angle of the spur gear toothing 3, 4.

These dimensions are governed by the following relationships:

The outside diameter $D_{VER}$ of the spur gear toothing 3, 4 is smaller than or equal to the bore diameter $D_{IR}$ of the separate inner ring 14, therefore $D_{VER} \leq D_{IR}$.

The inside diameter $D_{IVER}$ of the spur gear toothing 3, 4 is smaller by at least a factor of 0.95 than the outside diameter $D_{VER}$ of the spur gear toothing 3, 4, therefore $D_{IVER} < 0.95 \times D_{VER}$.

The row interval $R_{AB}$ of the bearing balls 15 is smaller than the outside diameter $D_{VER}$ of the spur gear toothing 3, 4, therefore $R_{AB} < D_{VER}$.

The pitch diameter $V_{TK}$ of the spur gear toothing 3, 4 is smaller than the pitch diameter GTK of the joint balls 30 therefore $V_{TK} < GTK$.

At the center line of the transmission-side ball row the distance LZ of the wheel hub 2 from the addendum circle of the spur gear toothing 4 is positive.

The outside diameter $D_{VER}$ of the spur gear toothing 3, 4 is more than twice the diameter $D_W$ of the bearing balls 15, therefore $D_{VER} > 2 \times D_W$.

The inner ring cross section height IQ at the lowest point of the ball raceway is at least 0.2 times the diameter $D_W$ of the bearing balls 15, therefore $IQ \geq 0.2 \times D$.

In order to increase the thread-bearing portion of the bolt 22, at least the area of the journal 20 of the outer joint body 7, in which the thread for the bolt 22 is situated, is of conically tapered design, consequently D1>D2. In the front end area 29 of the journal 20, which is oriented towards the bolt 22, the diameter D2 is therefore smaller than the diameter D1 of the journal 20 on the joint side.

The conically tapered design of the journal 20 has proven particularly advantageous. This makes it possible to increase the thread-bearing portion of the bolt 22 and in addition the conically tapered journal 20 of the outer joint body 7 facilitates assembly with the wheel hub 2. The journal can now easily be introduced into the wheel hub 2 and due to the larger diameter has a self-centering action when introduced into the wheel hub 2. In addition, the conically tapered geometry of the journal 20 helps to save weight.

The toothing angle β may be arranged positively or negatively in relation to the plane of rotation of the bearing assembly 1, and is preferably ±30°. It is particularly advantageous if the toothing angle β is inclined towards the outer joint body 7, since this affords better inner ring bracing and a larger toothing width for transmitting torque.

The spur gear toothing 3, 4 of the wheel hub 2 and the constant velocity joint 5 is in each case embodied as Hirth toothing with teeth running radially, the number of teeth being between 12 and 60.

The following figures show further exemplary embodiments of the means 27 for the axial compensation of tolerances of the two axial contact points, that is to say in the area of the spur gear toothing 3, 4 and the contact of the opposing face 25 against the face edge 24 of the bearing inner race 17. In the wheel bearing assembly 1 shown, two force paths A, B are created, a first force path A running from the outer joint body 7 via the spur gear toothing 3, 4 to the stub shaft 18. A second force path B runs from the outer joint body 7 via the bearing inner race 17 to the wheel hub 2. The two force paths A, B are therefore, at least in sections, designed to run kinematically parallel, especially at the contact points. The overall axial pre-tension generated by the tightening of the bolt 22 is divided according to the force paths A, B into a first pre-tension and a second pre-tension.

Figure 3:
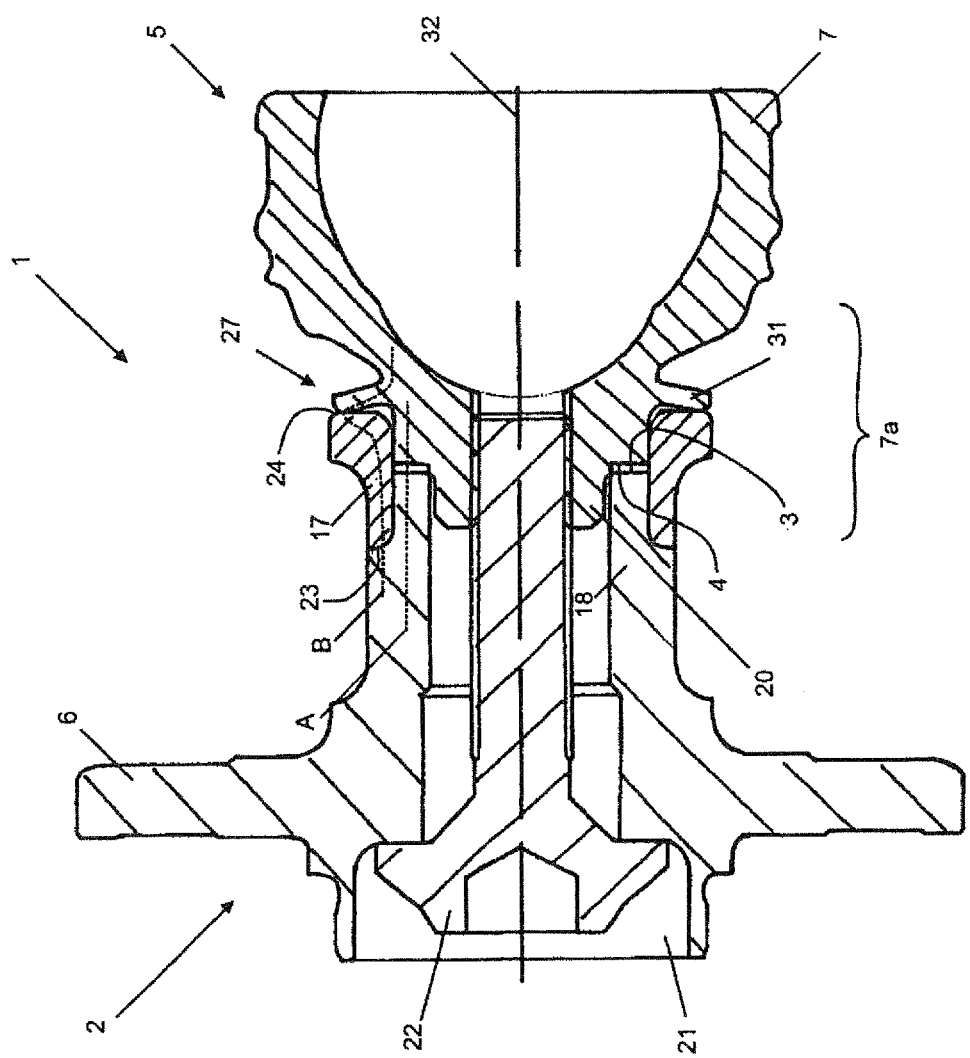
FIGS. 3-10 show sectional views through further exemplary embodiments of a wheel bearing assembly according to the invention.

FIG. 3 shows a somewhat modified representation of a further exemplary embodiment of a wheel bearing assembly 1. It should be pointed out, however, that features of the preceding figures and features of the succeeding figures could in each case also be used in the other exemplary embodiments. For example, the embodiment in FIG. 3 shows a more cylindrical journal 20, which can also be replaced, however, by a conically tapered journal 20 according to the preceding figures. Similarly, the various means 27 for the axial compensation of tolerances can also be used in the other embodiments. In FIG. 3, the means 27 is embodied as a circumferential rib 31, which in the longitudinal section shown has a constant thickness. In the longitudinal section, the rib 31 is inclined at an angle of approximately 10° in the direction of the bearing inner race 17 relative to a radial plane, which is aligned perpendicularly to the axis of rotation 32 of the bearing assembly. With its free end section this rib 31 bears circumferentially on the bearing inner race 17.

The rib 31 integrally formed onto the outer joint body 7 acts as a disk spring, which is connected to the outer joint body 7. In addition, the rib 31 may also have elasto-plastic characteristics, the rib 31 in the fitted state being deformed elastically or elasto-plastically according to the design and configuration, so as to produce the optimum distribution of pre-tensioning forces between toothing 3, 4 and bearing inner race 17.

Figure 4:
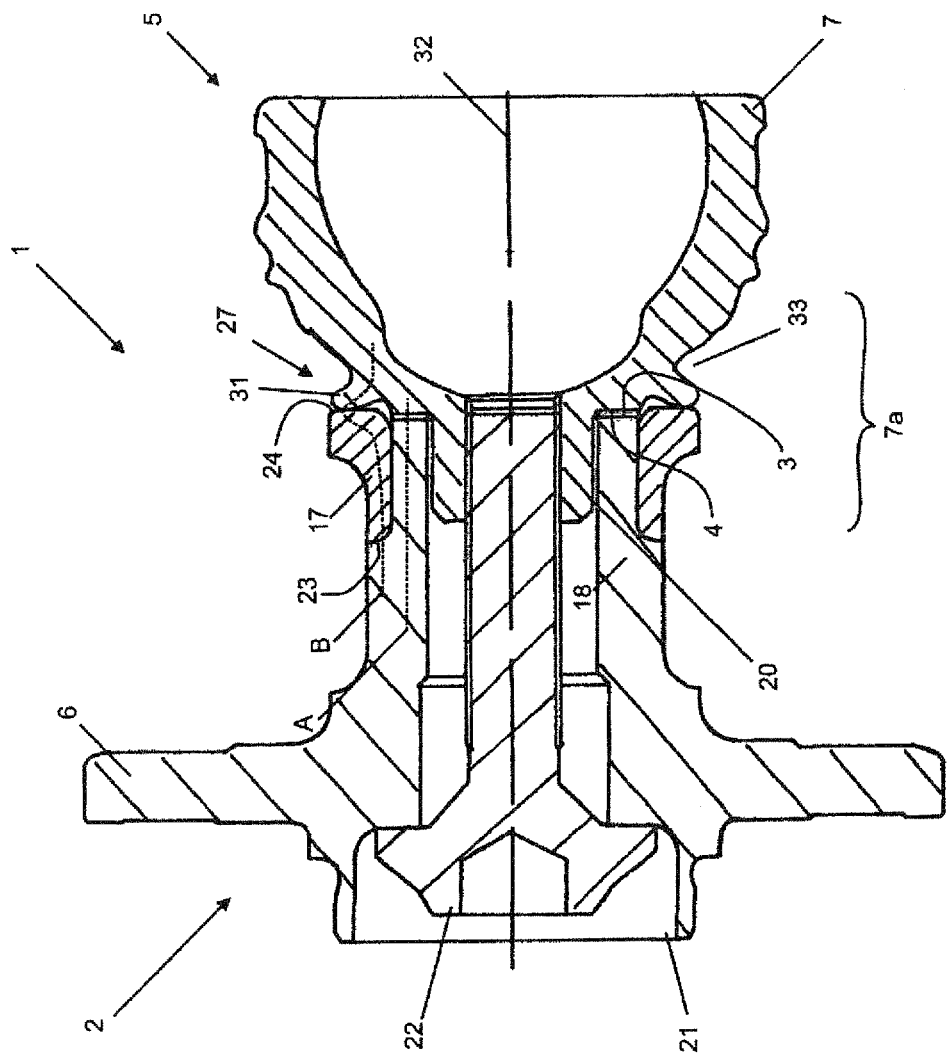

FIG. 4 in a similar representation to FIG. 3 shows a further exemplary embodiment of the rib 31, a recess 33 or a corresponding formed shape serving to form an elastic deformation area, so that the rib 31 is first elastically deformed on bracing of the outer joint body 7 and the wheel hub 2. In bracing the unit by way of the bolt 22, however, a plastic deformation of the rib 31 and the surrounding areas also ensues.

Figure 5:
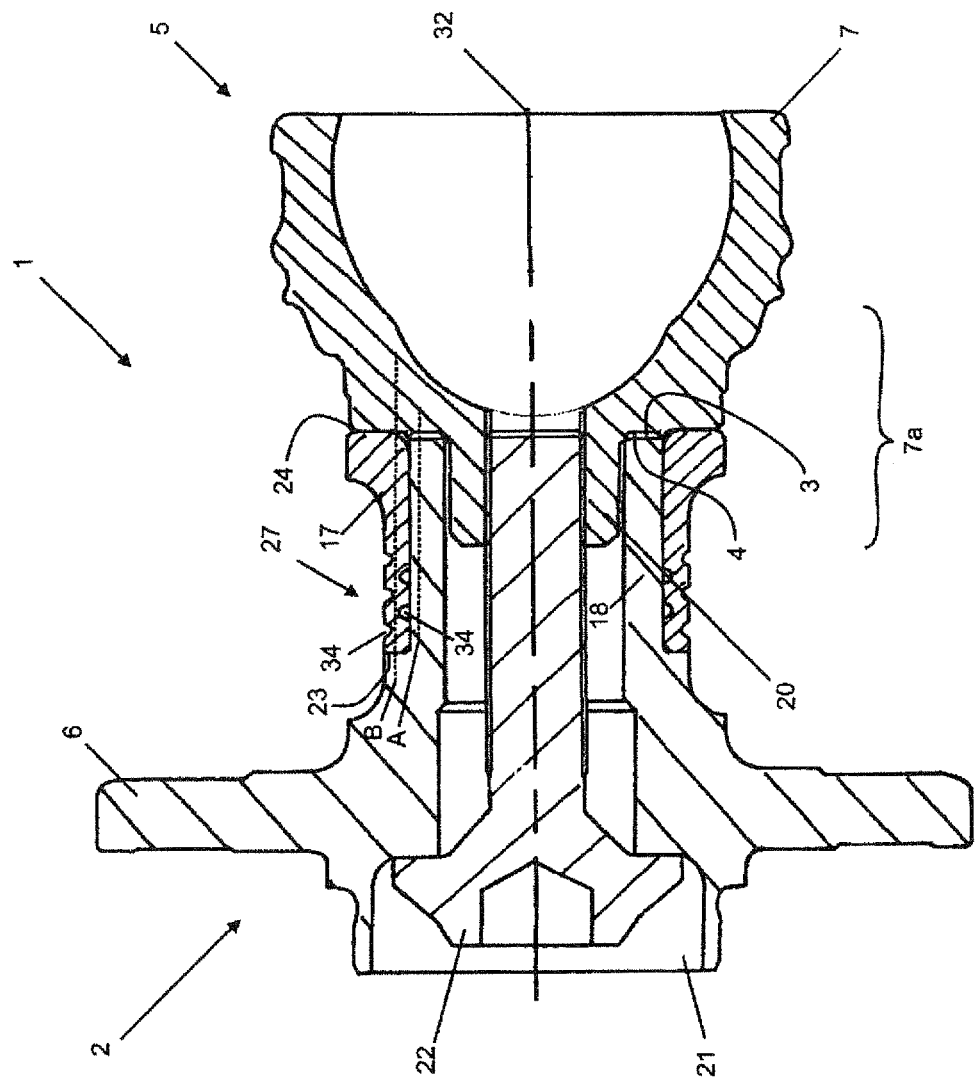

FIG. 5 shows a further exemplary embodiment of a means 27, the bearing inner race 17 in this embodiment having indentations 34 in an area facing the wheel hub 2. The indentations 34 may be produced by recesses, for example, and have a circumferential corrugated or helical shape or they are embodied as parallel grooves. The recesses may be introduced internally or eternally and may be designed so that they increase towards the transmission side, for example. In one embodiment the bearing inner race 17 may be partially hardened, so that the means 27 behaves more elastically. In another embodiment the bearing inner race 17 may be fully hardened, so that the means 27 has more elasto-plastic characteristics.

On subjecting the second force path B to a pre-tension, the bearing inner race 17 is first elastically compressed or deformed in the area of the indentations 34 and then plastically deformed or compressed in an axial direction.

Figure 6:
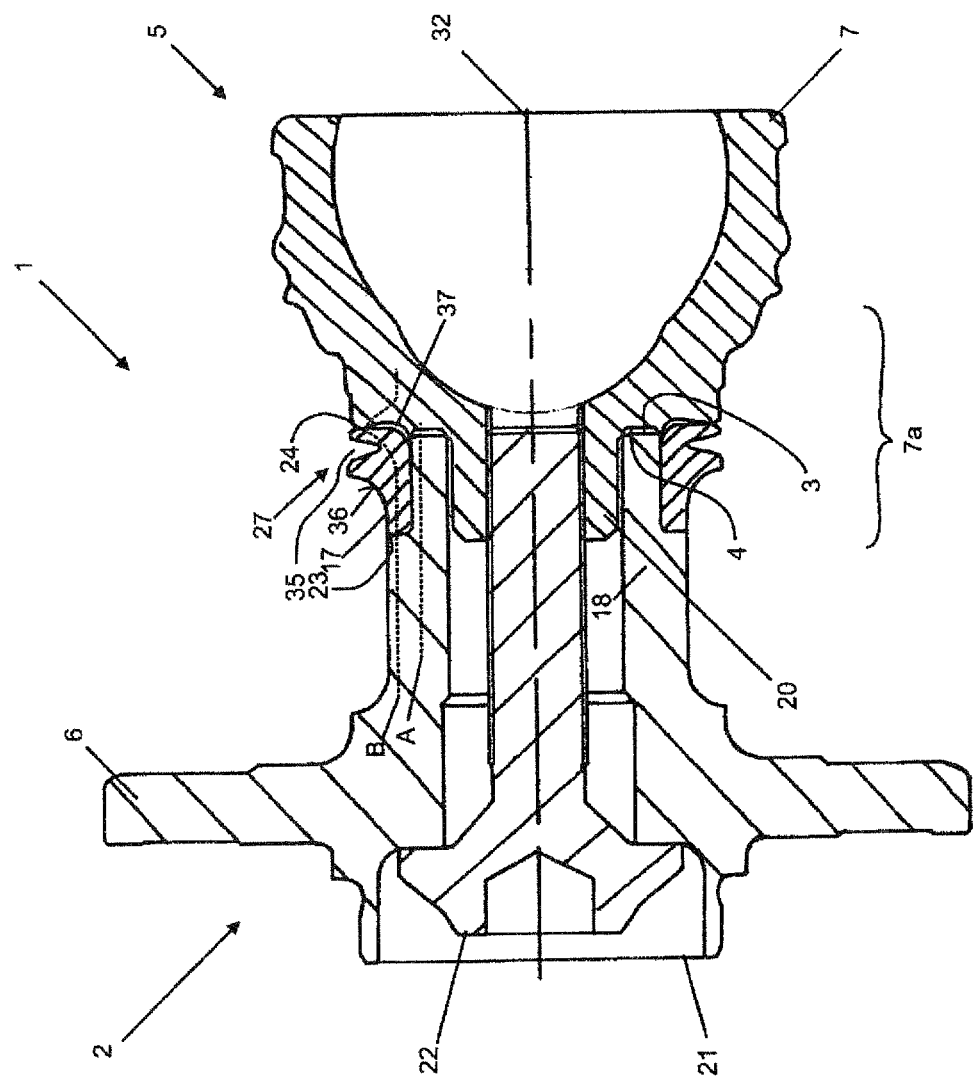

FIG. 6 shows a further embodiment of the invention, the means 27 being embodied as a circumferential V-shaped groove 35 in the bearing inner race 17 adjacent to the outer joint body 7. In contrast to the exemplary embodiment in FIG. 5, the additional deformation travel provided by the means 27 is now arranged so that under deformation the position of the running surface 36 for the rolling elements on the bearing inner race 17 is not changed. In the representation in FIG. 6 the groove 35 is introduced on the outside of the bearing inner race 17; alternatively the groove may also be positioned on the inside. It is furthermore possible to introduce multiple grooves 35 or differently shaped grooves 35. In order to ensure a sufficient free space for the deformation of the bearing inner race 17 in the area of the means 27, the bearing inner race 17 bears radially outwards only in a partial circumferential area, whereas a free space 37 is provided in a radially inner area.

Figure 7:
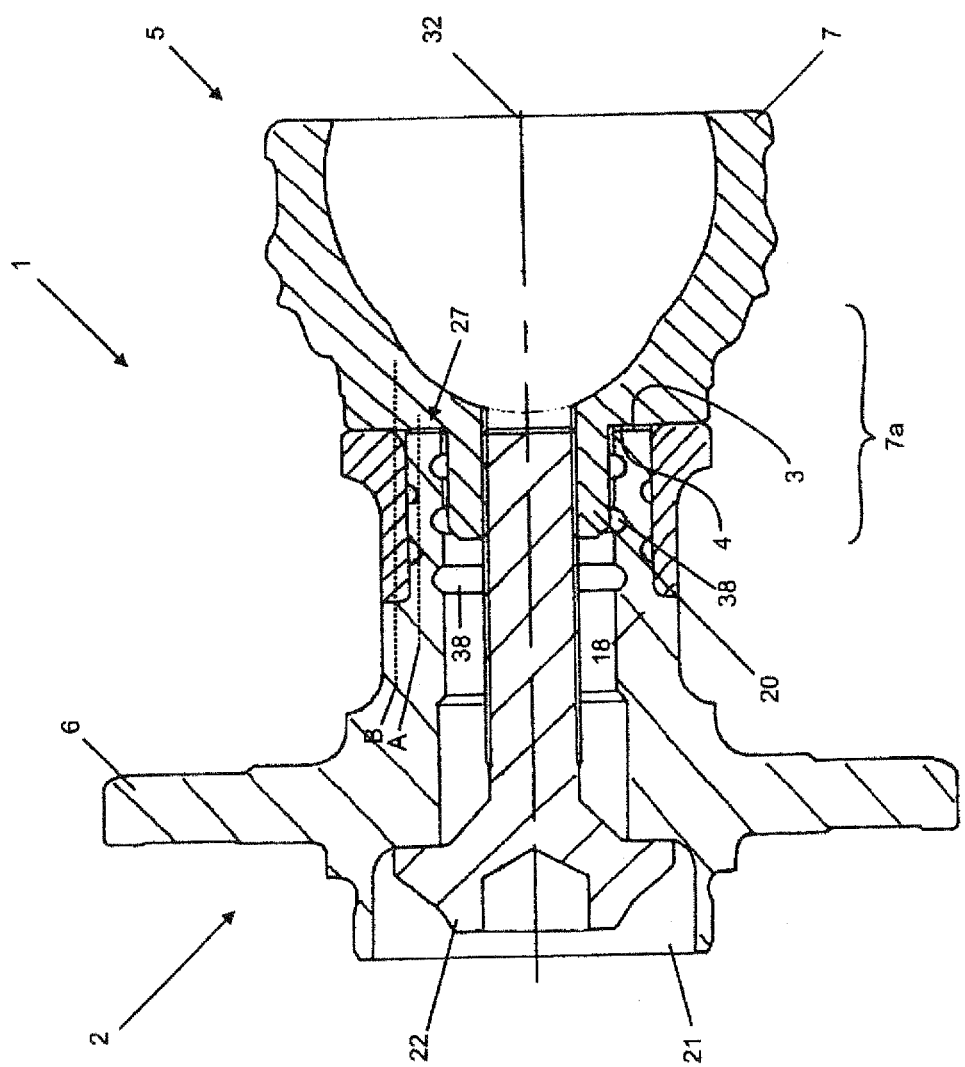

FIG. 7 shows a further exemplary embodiment of the means 27, the means 27 in this exemplary embodiment being embodied as recesses 38 on the stub shaft 18. The recesses 38 shown for creating a corrugated shape may also be designed asymmetrically thicker inwards/outwards or towards the transmission side.

Figure 8:
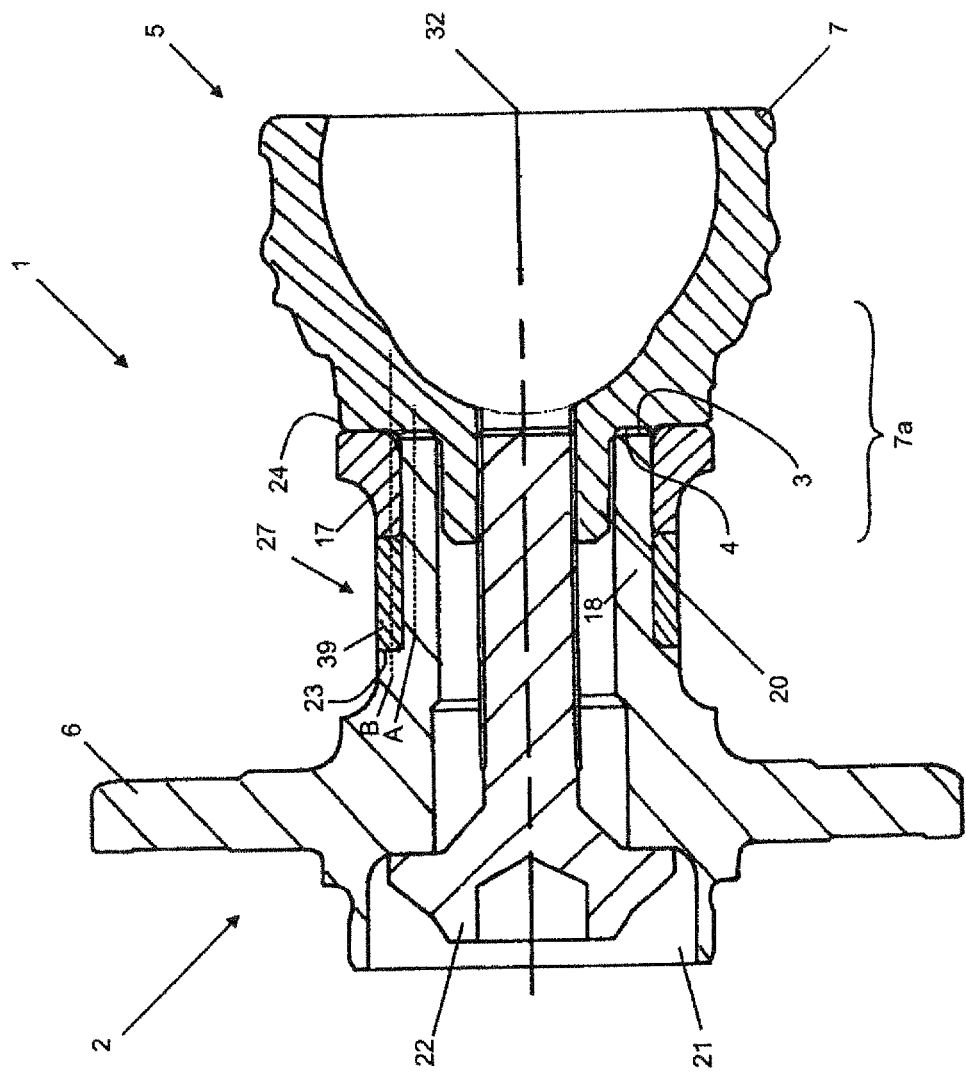

FIG. 8 shows another exemplary embodiment of the invention, the means 27 being embodied as an intermediate ring 39, which is mounted on the stub shaft 18. The intermediate ring 39 is clamped between the wheel hub 2 and the bearing inner race 17. In a first embodiment, the intermediate ring 39 may be embodied as an elastic intermediate ring 39, while in a further embodiment, the intermediate ring 39 may be embodied as a compression ring. Although the intermediate ring 39 in FIG. 8 is represented as cylindrical, a corrugated design similar to the preceding FIGS. 5 and 7, for example, is also possible. The intermediate ring 39 may be produced by a chip-forming method (turning), for example. Manufacture by means of rolling is also conceivable.

Figure 9:
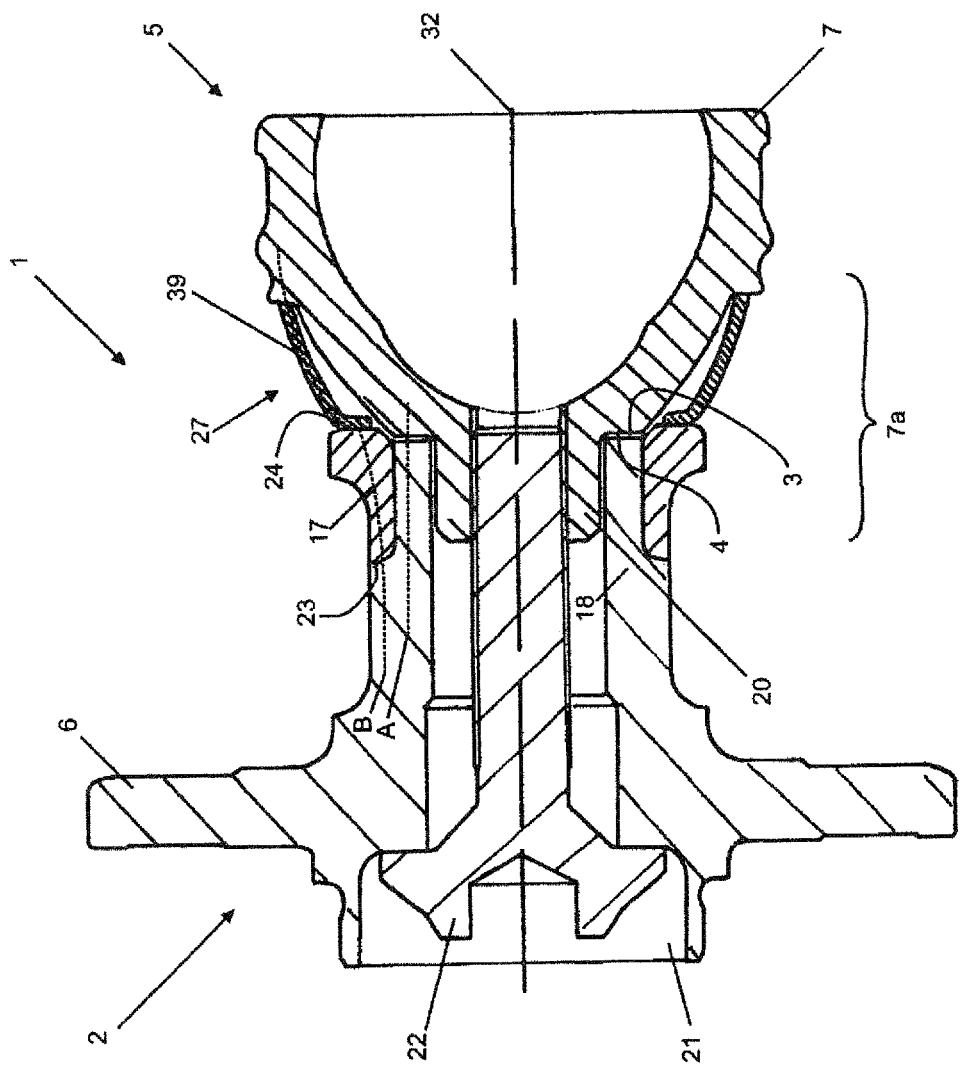

FIG. 9 shows a further exemplary embodiment of the invention, the intermediate ring 39 in this embodiment being arranged in the form of a compression ring between the outer joint body 7 and the bearing inner race 17, so that this is inserted in the force path B. The intermediate ring 39 may be produced by a forming method such as deep drawing, for example. Different degrees of curvature in the intermediate ring 39 allow the behavior to be purposely controlled, thereby affording elastic and elasto-plastic deformation zones.

Figure 10:
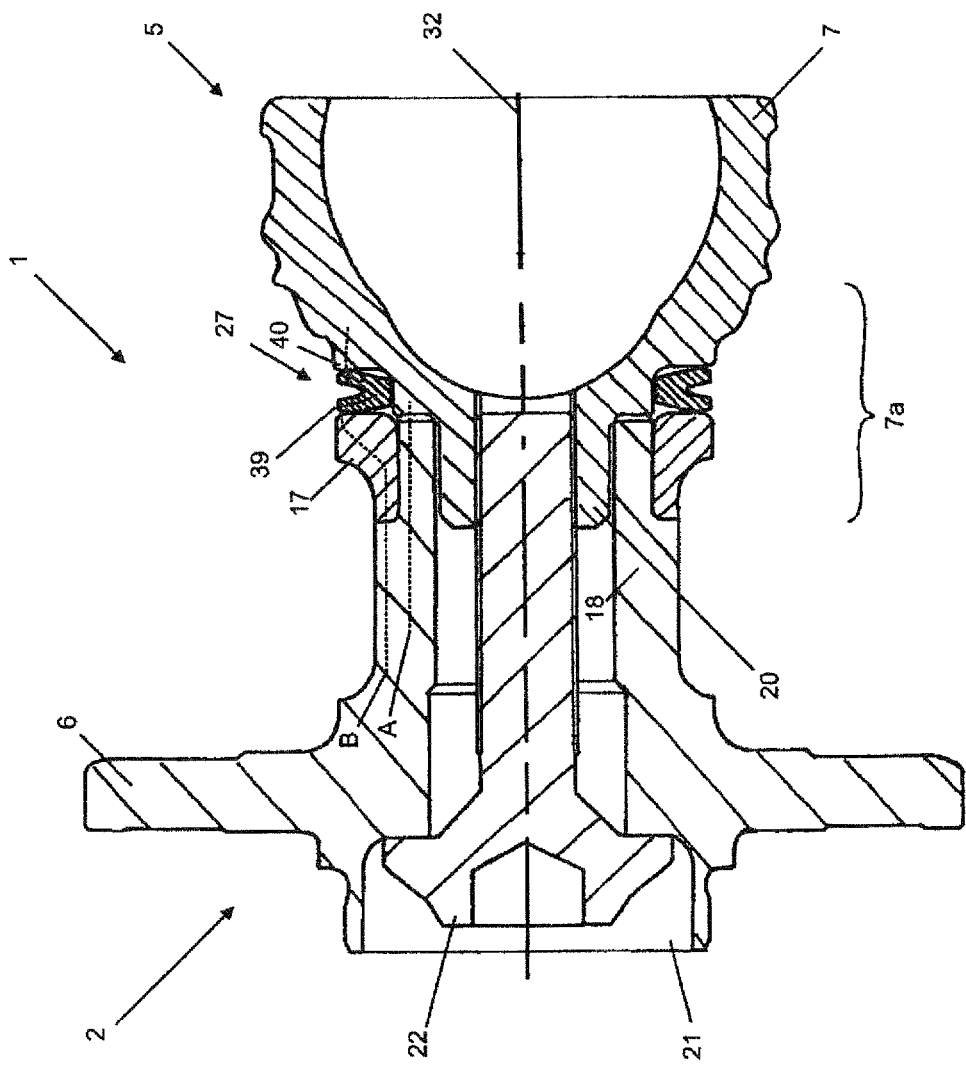

FIG. 10 shows a further example of an intermediate ring 39 which in the longitudinal section shown is approximately V-shaped. The intermediate ring 39 represented may be produced by a chip-forming method (turning), for example; manufacture by means of rolling is also conceivable. In this variant the groove base of the V-shaped groove in the intermediate ring 39 serves for plasticization, whereas the legs are more elastically resilient. The intermediate ring 39 bears against the bearing inner race 17 on one side, and with the other side or with the other leg bears against a shoulder 40 of the outer joint body 7.

Figure 11:
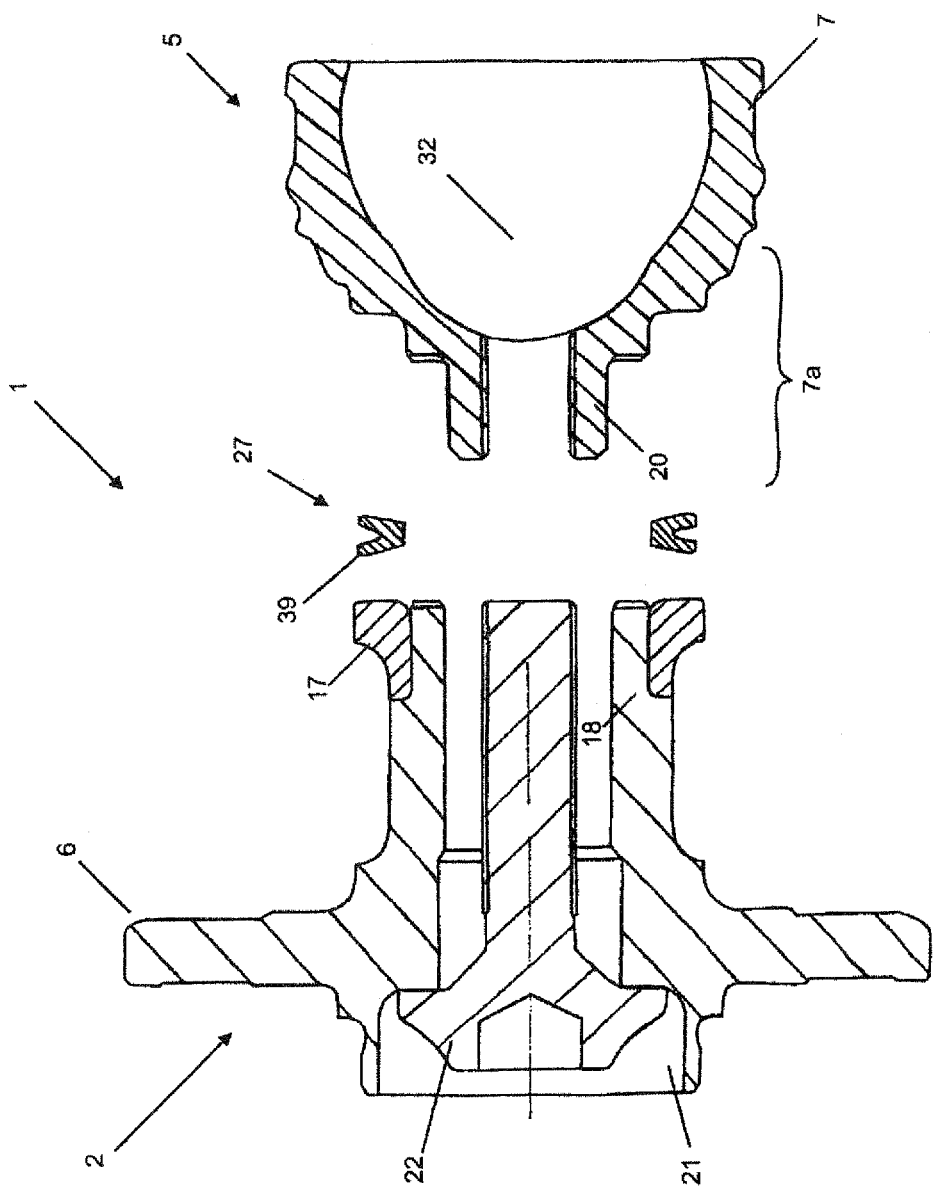
FIG. 11 shows an exploded drawing of the exemplary embodiment in FIG. 10.

FIG. 11 shows the components of the wheel bearing assembly 1 with the intermediate ring 39 shown in FIG. 10 in a disengaged state. From this representation is can also be clearly seen that the stub shaft 18 in the end section is not expanded and in particular is designed so that the bearing inner race 17 can be drawn on and off.

In bringing the individual components of the wheel bearing assembly 1 together according to FIGS. 12 to 14, in a first step, the expansion bolt or the bolt 22 in the outer joint body 7 is screwed in, the intermediate ring 39 lying loosely (undeformed) between the outer joint body 7 and the bearing inner race 17. The mating toothing systems 3, 4 are still separated.

On screwing in the expansion bolt the mating toothing systems 3, 4 migrate towards one another (S2<S1). The intermediate ring 39 is deformed in the elastic area and thereby begins to build up the pre-tensioning force on the bearing inner race 17. In assembling, it is necessary to make sure that the spur gear toothing 3, 4 has meshed, that is to say that the teeth of the spur gear toothing 3, 4 have located one another. FIG. 14 shows the wheel bearing assembly 1 in the fitted area. Here the expansion bolt or the bolt 22 is fully fitted and the toothing 3, 4 is pre-tensioned. The intermediate ring 39 as compensating element is deformed in the plastic area and applies the required pre-tensioning force to the bearing inner race 17. In so doing, the intermediate ring 39 compensates for dimensional variations present in the system and caused by production tolerances.

Figure 16:
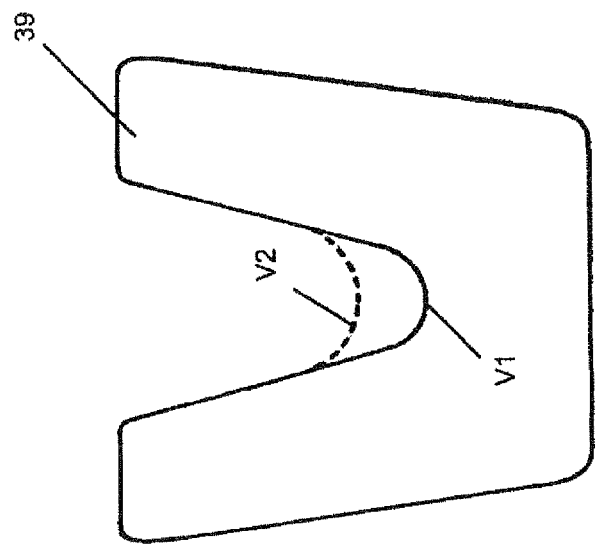
FIGS. 15, 16 show optimized forms of the intermediate ring in FIG. 10.
Figure 15:
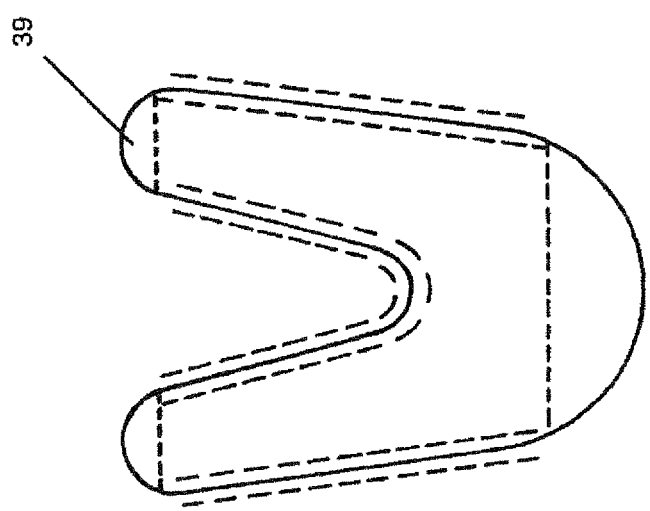

From the example of the intermediate ring 39 in the preceding figures, FIGS. 15, 16 illustrate the degrees of freedom that are available for optimization of the intermediate element 39 as compensating element. Limiting the intermediate ring 39 to the horizontal lines saves 'dead material' and enhances the producability, since the ring can be better accommodated in a production machine. The lateral lines represent the possibility for making the legs thicker or thinner—either symmetrically or asymmetrically. The length of the legs may be varied by raising or lowering the base (middle) of the groove. It turns out here that increasing the width of the legs brings about a disproportionate increase in the rigidity of the intermediate ring 39; as a first approximation, a variation of the leg length has a linear effect on the rigidity.

FIG. 16 shows a preferred, optimized form of the intermediate ring 39. The faces on the outside and inside diameters are of cylindrical design for the sake of a good finish. After defining the rough geometry (angular and leg thickness), fine adjustment of the intermediate ring 39 is advantageously undertaken via the leg length, that is to say through variation of the position of the groove base, a deep groove being chosen in a first variant V1 and a shallow groove in a second variant V2.

Figure 17:
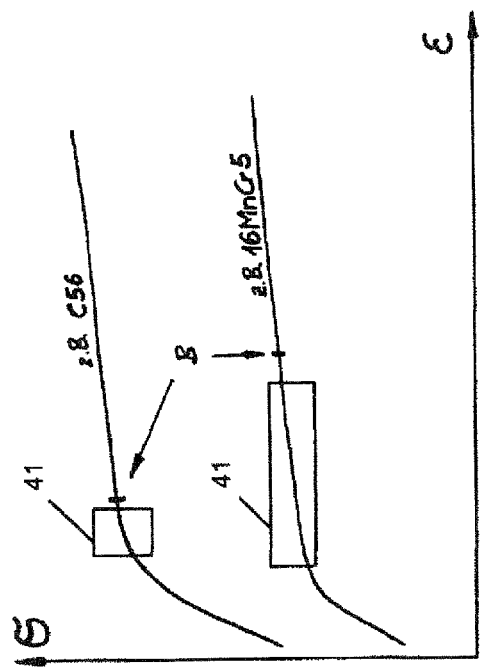

FIG. 17 shows a stress-strain diagram for two different materials for the loading of an intermediate ring 39. The strain ε (deltaL divided by L0) is plotted on the X axis; the Y axis shows the stress σ. The ultimate failure limit is entered at the points B, where a material failure of the intermediate ring 39 occurs. The working range 41 of the intermediate ring 39 is preferably placed into the range beyond the proportional, elastic range, that is to say where the material behavior moves into the plastic range and the curve runs flatter. The load limit is to be set at a safe interval from the fracture strain B. If the fracture strain is 8%, for example, the actual deformation should not exceed 4%.

Figure 18:
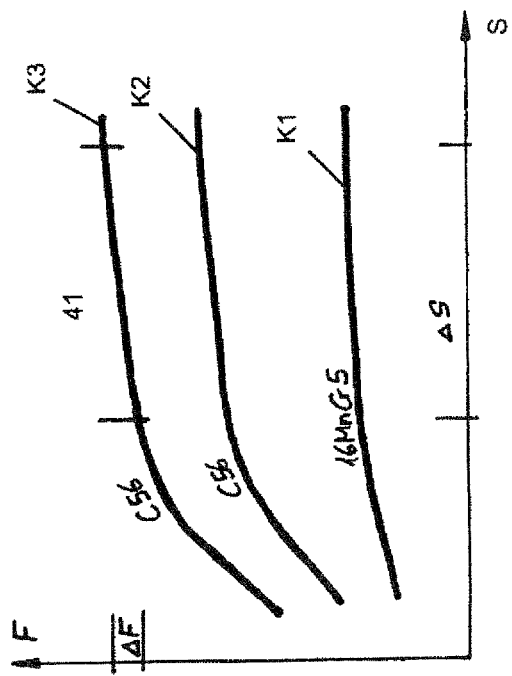
FIGS. 17, 18 show graphs to illustrate the working range of the intermediate ring in FIG. 10.

FIG. 18, derived from the content of FIG. 17, represents the pre-tensioning force F of the bearing inner race 17 over the initial play S of the bearing assembly 1 due to tolerance. Initial play S is here taken to mean the distance in an axial direction between the mating toothing systems, when the outer joint body 7 via the intermediate ring 39 is up against the bearing inner race 17. It is therefore the distance that has to be bridged by deformation in the compensating element 39 in order to bring the toothing into contact. In the design range 41, only a very slight variation delta F in the pretension corresponds to a very large initial play delta S. In the area of the initial play delta S the bearing inner race 17 can therefore be pre-tensioned with a maximum deviation of delta F. The three graphs shown in FIG. 18 show different material variants for the intermediate ring 39 in the preceding figures. The bottom curve K1 represents the profile of the pre-tensioning force for an element composed of 16MnCr5 having the geometry shown in FIG. 16, variant V 1. The middle curve K2 corresponds to the profile for the same geometry but another material, that is to say C56. The top curve shows the profile of an intermediate ring 39 composed of C56 according to FIG. 16, variant 2. Common to all three variants K1 to K3 is the fact that in the design or working range 41 the force increase runs very flat in the plastic range of the intermediate ring 39.

The following figures each show different embodiments of the means 27 in the form of an intermediate ring 39, in order to demonstrate the variety of possibilities.

Figure 20:
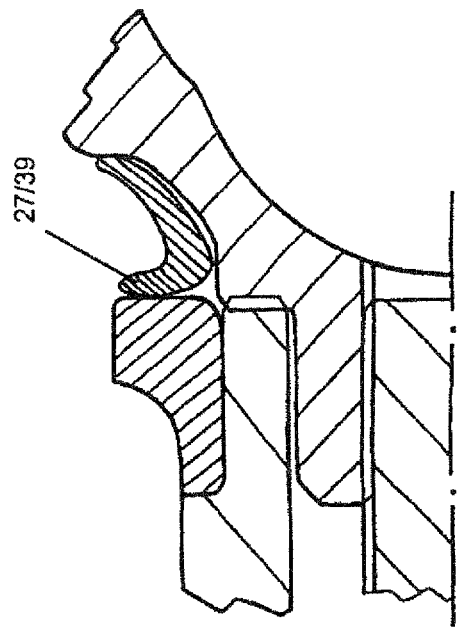
FIGS. 19-26 show modified exemplary embodiments for the intermediate ring in FIG. 10.
Figure 19:
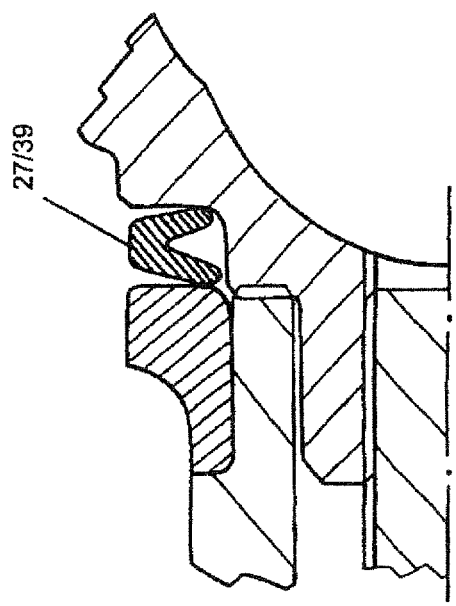
Figure 22:
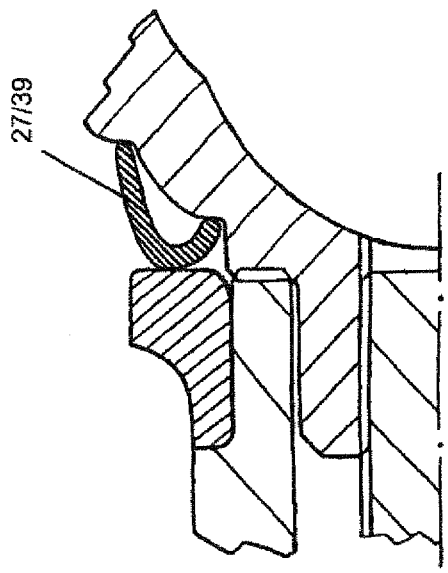
Figure 21:
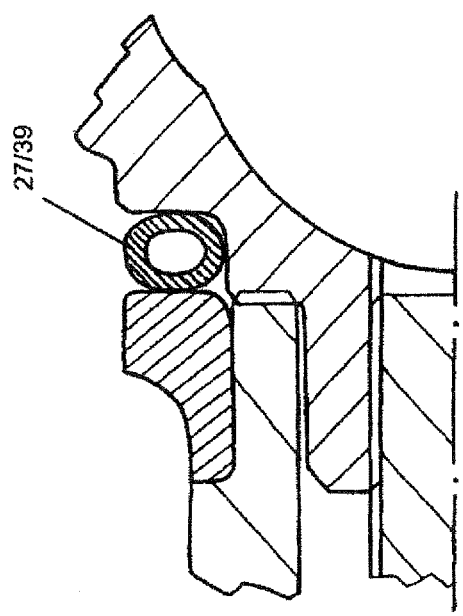
Figure 24:
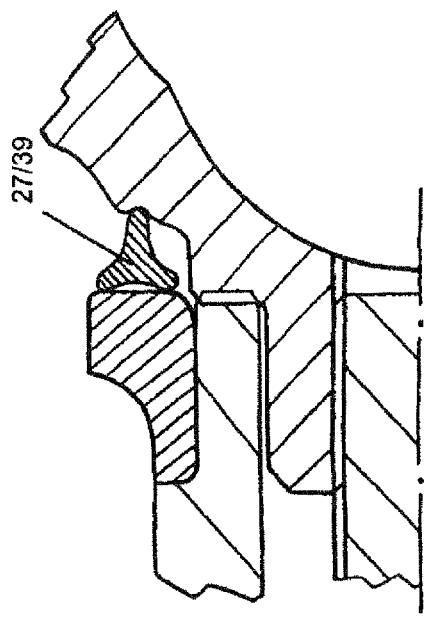
Figure 23:
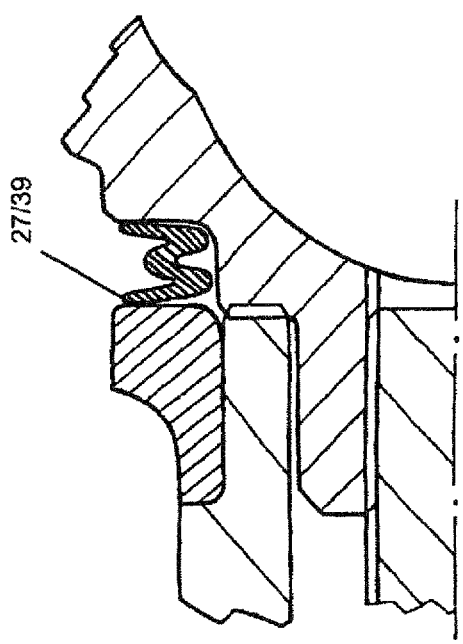
Figure 26:
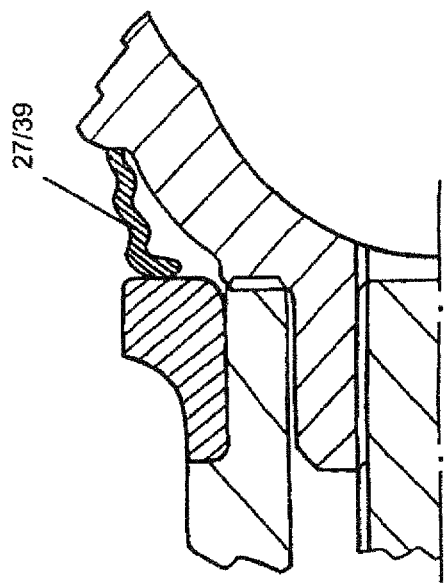
Figure 25:
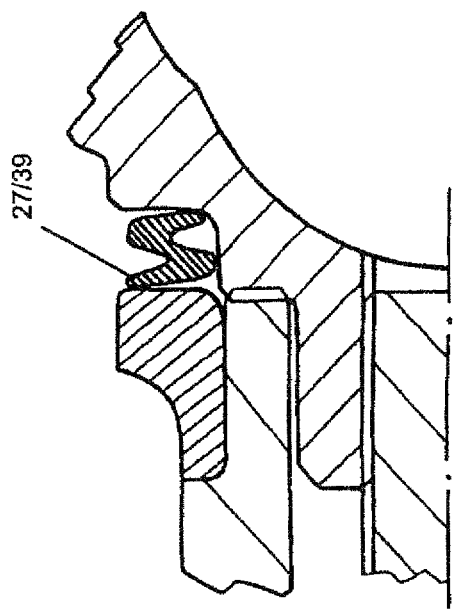

FIG. 19 represents an intermediate ring 39 in the form of an A-ring, as inverse variant of the V or U-ring. FIG. 20 shows a U-ring as an asymmetrical variant of the V-ring that allows a greater axial expansion. FIG. 21 shows an intermediate ring 39 in the form of an O-ring, a semi-finished tubular product in this application being bent as a ring. FIG. 22 shows an intermediate ring 39 in the form of a C-ring, the intermediate ring 39 in this variant bearing at two points on the outer joint body 7. Like the variant shown, the open side may also face the bearing inner race 17. FIG. 23 shows an intermediate ring 39 in the form of a W-ring, which is also conceivable in reverse form as an M-ring. This variant with the multiple folding is more softly resilient than the intermediate rings of simpler design in the preceding figures. FIG. 24 illustrates a T-ring, a variation with transverse T-bar to the outer joint body 7 also being possible. This variation affords a harder resilience than the preceding variants. An X-ring construction with crossed legs is also possible. FIG. 25 shows an N-ring, also referred to as an S-ring or Z-ring. The leg against the bearing inner race 17 can also rest against the inside diameter. Due to the geometry this design is softer than the V-ring but harder then the W-ring. The embodiment in FIG. 26 shows a corrugated ring, which is particularly suited to very large axial expansions, but takes up little overall radial space. A variant turned through 90°, in which the corrugated bearing inner race respectively stands against the outer joint body 7, is also conceivable.

To sum up, a bearing assembly 1 in a new type of geometry is described, the stub shaft 18 on the outside forming a seat for the bearing inner race 17 extending right into the edge area, not being deformed or roll-riveted, especially at the free end, and being provided directly with the spur gear toothing 3. The outside diameter of the toothing 3 or 4 is smaller than or equal to the inside diameter of the bearing inner race 17. Since in the case of the axial pre-tension, that is to say that of the bearing or the bearing inner race 17 and the spur gear toothing 3, 4, these rely on a defined pre-tensioning force but in parallel connection have a reciprocal influence on one another, measures have to be taken to keep this influence within admissible bounds. One proposed aspect of the invention is a means 27 for the axial compensation of tolerances, since the new design construction represented is an axial double fit.

The means 27 may be embodied as a purely elastic element. In an enhancement the means 27 is embodied as an elasto-plastic means, which by means of the shallow increase in force in the plastic range described above produces a low dispersion of pre-tensioning force. In series production, it is precisely this dispersion that is a critical factor, because the bearing pre-tension has a substantial influence on the service life of the bearing. In some applications, the tolerance chain gives rise to a dimensional uncertainty of up to 0.3 mm; in a correlation with the spring rigidity of an elastic element this can lead to an inadmissible dispersion of the tensioning force acting on the bearing inner race 17. In this case, the elasto-plastic element which reduces the dispersion, is to be preferred.

The elastic or elasto-plastic element may be both integrally formed on and embodied as a separate element or component. An advantage to the embodiment as a separate element is the replaceability of the joint cap 7 and the outer joint body or bearing 17, without also having to replace the other component in each instance. It is merely necessary to use a new compensating element 39.

LIST OF REFERENCE NUMERALS

1 Bearing assembly
2 Wheel hub
3 Spur gear toothing
4 Spur gear toothing
5 Rotating joint or constant velocity joint
6 Wheel flange
7 Outer joint body
8 Raceway
11 Rolling bearing
12 Outer ring
13 Fixing flange
14 Inner ring
15 Bearing ball
16 Bearing inner race
17 Bearing inner race
18 Stub shaft
19 End face
20 Journal
21 Bore
22 Bolt
23 End face
24 End face
25 Race/opposing face
26 Locating surface
27 Means, recess
28 Annular groove
29 Front end area of the journal 20
30 Joint ball
31 Rib
32 Axis of rotation 33 Recess
34 Indentations, recesses
35 Groove
36 Running surface
37 Free space
38 Recess
39 Intermediate ring
40 Shoulder
41 Design range
$D_{VER}$: outside diameter of the spur gear toothing 3, 4
$D_{IR}$: bore diameter of the separate inner ring 14
$D_{IVER}$: inside diameter of the spur gear toothing 3, 4
$R_{AB}$: row interval of the bearing balls 15
$I_{RB}$: width of the separate bearing inner race 17
$V_{TK}$: pitch diameter of the spur gear toothing 3, 4
GTK: pitch diameter of the joint balls 30
LZ: distance of the wheel hub 2, at the center line of the transmission-side ball row, from the addendum circle of the spur gear toothing 4
$D_W$: diameter of the bearing ball 15
IQ: cross section height at the lowest point of the ball raceway of the separate bearing inner race 17
D1: diameter of the journal 20 in the area of the transition to the inside diameter $D_{IVER}$ of the spur gear toothing 3,4
D2: diameter of the journal 20 in the area of its front, wheel side end area 29
β: toothing angle of the spur gear toothing 3, 4.

The invention claimed is:

1. A wheel bearing assembly comprising
an adapter section, connectable to another adapter element,
a journal section, connectable to a wheel hub,
a separate inner race, having a raceway for rolling elements of the wheel bearing assembly and arranged on the journal section,
the adapter section and the journal section intermeshing with one another via a spur gear toothing,
and comprising a tensioning element, which reciprocally braces the adapter section and the journal section under an overall pre-tension,
the spur gear toothing being held by a first pre-tension along a first force path between the adapter section and the journal section,
wherein the separate inner race is clamped between the adapter section and the journal section with a second pre-tension along a second force path between the adapter section and the journal section, the first force path and the second force path, at least in part, running parallel to one another.

2. The wheel bearing assembly of claim 1, wherein the journal section is a cylindrical and/or hollow cylindrical section and/or end section.

3. The wheel bearing assembly of claim 1, wherein an elastic deformation means, which affords an additional deformation travel in at least one of the first force path and the second force path, is inserted in the at least one of the first force path and the second force path.

4. The wheel bearing assembly of claim 3, wherein the deformation means is arranged so that the magnitude of the first pre-tension is greater than the magnitude of the second pre-tension.

5. The wheel bearing assembly of claim 4, wherein a selected working range of the deformation means in the fitted state lies below an ultimate failure limit of the deformation means.

6. The wheel bearing assembly of claim 3, wherein the deformation means is arranged so that in the fitted state the deformation means is subjected to one of the first pre-tension and the second pre-tension such that the deformation means is plastically deformed.

7. The wheel bearing assembly of claim 3, wherein the deformation means is embodied as an element or element assembly, which is integrally formed onto the adapter section and which is connected in the second force path between the adapter section and the separate inner race.

8. The wheel bearing assembly of claim 7, wherein the deformation means is embodied as a circumferential rib or rib sections, which when assembled bears with a free end section against the separate inner race.

9. The wheel bearing assembly of claim 3, wherein the deformation means is embodied as a deformation zone in the journal section.

10. The wheel bearing assembly of claim 9, wherein the deformation zone is formed by areas of reduced material thickness in the journal section.

11. The wheel bearing assembly of claim 3, wherein the deformation means is formed as a deformation zone in the separate inner race.

12. The wheel bearing assembly of claim 11, wherein the deformation zone is embodied as one or more circumferential grooves.

13. The wheel bearing assembly of claim 11, wherein the deformation zone is arranged on a side of the separate inner race facing the adapter section.

14. The wheel bearing assembly of claim 3, wherein the deformation means is embodied as an intermediate ring.

15. The wheel bearing assembly of claim 14, wherein the intermediate ring is arranged one of:
between the separate inner race and the journal section; and
between the separate inner race and the adapter section.

16. The wheel bearing assembly of claim 14, wherein the intermediate ring is embodied as one of a spring ring and a compression ring.

17. The wheel bearing assembly of claim 14, wherein the intermediate ring has a spring geometry.

18. The wheel bearing assembly of claim 17, wherein the intermediate ring, in longitudinal section through the axis of rotation of the wheel bearing assembly, is folded at least once.

19. The wheel bearing assembly of claim 3, wherein the deformation means arranged in the first force path, the wheel bearing assembly being designed so that during assembly the first pre-tension is first formed on the first force path and the second, pre-tension is formed on the second force path only once a proportion of the first pre-tension has been built up.

20. The wheel bearing assembly of claim 3, wherein the deformation means is arranged in the second force path, the wheel bearing assembly being designed so that during assembly the second pre-tension is first formed on the second force path and the first pre-tension is formed on the first force path only once a proportion of the second pre-tension has been built up.

21. A bearing assembly of a wheel hub of a motor vehicle drivable via a constant-velocity joint comprising a wheel bearing assembly of claim 1, in which the wheel hub connected to the wheel flange and the constant velocity joint connected to a drive shaft are rotationally locked together by the spur gear toothing and are axially connected together by a threaded bolt engaging in a central journal of the constant velocity joint, the bearing assembly further comprising a double or multi-row rolling bearing fitted on the wheel hub and including bearing balls, the wheel hub having an inner ring with the separate inner race, an end face of a stub shaft, embodied as the journal section of the wheel hub having the spur gear toothing, which can be rotationally locked to the corresponding spur gear toothing of the adapter section of the constant velocity joint.

22. The bearing assembly of claim 21, wherein the separate bearing inner race projects with an end face axially beyond the end of the stub shaft of the wheel hub and in that the spur gear toothing systems are arranged radially and axially at least partly below the rolling bearing and in that the journal of the outer joint body is of conically tapered design, a diameter (D2) of the journal in the area of its wheel side, front end area being smaller than its joint-side diameter (D1), whereby D1>D2.

23. The bearing assembly of claim 21, wherein an outside diameter ($D_{VER}$) of the spur gear toothing is smaller than or equal to a bore diameter ($D_{IR}$) of the inner ring, whereby $D_{VER} \leq D_{IR}$.

24. The bearing assembly of claim 21, wherein an inside diameter ($D_{IVER}$) of the spur gear toothing is smaller by at least a factor of 0.95 than an outside diameter ($D_{VER}$) of the spur gear toothing, whereby $D_{IVER} < 0.95 \times D_{VER}$.

25. The bearing assembly of claim 21, wherein a row interval ($R_{AB}$) of the bearing balls is smaller than an outside diameter ($D_{VER}$) of the spur gear toothing, whereby $R_{AB} < D_{VER}$.

26. The bearing assembly of claim 21, wherein a pitch diameter ($V_{TK}$) of the spur gear toothing is smaller than a pitch diameter (GTK) of joint balls of the constant velocity joint, whereby $V_{TK} < GTK$.

27. The bearing assembly of claim 21, wherein an inner ring cross section height (IQ) at the lowest point of the ball raceway is at least 0.2 times a diameter ($D_W$) of the bearing balls, whereby $IQ \leq 0.2 \times D_W$.

28. The bearing assembly of claim 21, wherein a distance (LZ) of the wheel hub viewed from a center line of a transmission-side ball row to an addendum circle of the spur gear toothing is positive.

29. The bearing assembly of claim 21, wherein an outside diameter ($D_{VER}$) of the spur gear toothing is more than twice a diameter ($D_W$) of the bearing balls, whereby $D_{VER} < 2 \times D_W$.

30. The bearing assembly of claim 21, wherein the separate inner race is connected to a means for the axial compensation of tolerances between the separate bearing inner race and the opposing face of the outer joint body.

31. The bearing assembly of claim 30, wherein the means for the axial compensation of tolerances between the separate inner race and the opposing face of the joint body is an axial recess in the form of an annular groove in the end face of the outer joint body.

32. The bearing assembly of claim 21, wherein the toothing angle ($\beta$) is arranged positively or negatively to the plane of rotation of the bearing assembly at an angle ($\beta$) of ±30°.

33. The bearing assembly of claim 32, wherein the toothing angle ($\beta$) of the spur gear toothing is inclined in relation to the outer joint body.

34. The bearing assembly of claim 21, wherein the spur gear toothing is a Hirth toothing having 12 to 60 teeth running radially.

* * * * *

UNITED STATES PATENT AND TRADEMARK OFFICE
CERTIFICATE OF CORRECTION

PATENT NO.        : 8,439,572 B2
APPLICATION NO.   : 12/594362
DATED             : May 14, 2013
INVENTOR(S)       : Fischer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 892 days.

Signed and Sealed this
Eighth Day of September, 2015

Michelle K. Lee
*Director of the United States Patent and Trademark Office*